United States Patent
Shuck et al.

(10) Patent No.: US 11,820,070 B2
(45) Date of Patent: Nov. 21, 2023

(54) FUSED FILAMENT FABRICATION OF HIGH ENTROPY ALLOYS

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 150 days.

(21) Appl. No.: 17/095,226

(22) Filed: Nov. 11, 2020

(65) Prior Publication Data
US 2021/0146602 A1    May 20, 2021

Related U.S. Application Data

(60) Provisional application No. 62/935,394, filed on Nov. 14, 2019.

(51) Int. Cl.
*B29C 64/118*    (2017.01)
*B29C 64/295*    (2017.01)
(Continued)

(52) U.S. Cl.
CPC .......... *B29C 64/118* (2017.08); *B29C 64/205* (2017.08); *B29C 64/245* (2017.08);
(Continued)

(58) Field of Classification Search
CPC ... B29C 64/118; B29C 64/205; B29C 64/245; B29C 64/295; B33Y 10/00
See application file for complete search history.

(56) References Cited

U.S. PATENT DOCUMENTS 5,900,207 A * 5/1999 Danforth ........... C04B 35/63436
                                                                    419/36
2002/0157737 A1   10/2002 Chesnes et al.
(Continued)

FOREIGN PATENT DOCUMENTS

CN    107096923 A    8/2017
CN    108393558 A    8/2018
(Continued)

OTHER PUBLICATIONS

Shuying Chen, Additive Manufacturing of High-Entropy Alloys, 2018, (Year: 2018).*
(Continued)

*Primary Examiner* — Joseph S Del Sole
*Assistant Examiner* — Mohamed K Ahmed Ali
(74) *Attorney, Agent, or Firm* — Shumaker & Sieffert, P.A.

(57) ABSTRACT

An additive manufacturing technique includes depositing, via a filament delivery device, a filament onto a surface of a substrate. The filament includes a binder and a high entropy alloy powder. The technique also includes sacrificing the binder to form a preform and sintering the preform to form a component.

12 Claims, 2 Drawing Sheets

(51) Int. Cl.
B29C 64/205 (2017.01)
B29C 64/245 (2017.01)
B33Y 10/00 (2015.01)
B33Y 70/00 (2020.01)
B29L 31/18 (2006.01)
B33Y 30/00 (2015.01)
B33Y 80/00 (2015.01)
B29K 103/06 (2006.01)
B29K 29/00 (2006.01)
B29K 25/00 (2006.01)
B29K 55/02 (2006.01)
B29K 67/00 (2006.01)
B29L 31/08 (2006.01)

(52) U.S. Cl.
CPC ............ B29C 64/295 (2017.08); B33Y 70/00 (2014.12); B29K 2025/06 (2013.01); B29K 2029/04 (2013.01); B29K 2055/02 (2013.01); B29K 2067/046 (2013.01); B29K 2103/06 (2013.01); B29L 2031/082 (2013.01); B29L 2031/18 (2013.01); B33Y 10/00 (2014.12); B33Y 30/00 (2014.12); B33Y 80/00 (2014.12)

(56) References Cited

U.S. PATENT DOCUMENTS

| | | |
|---|---|---|
| 2002/0159914 A1 | 10/2002 | Yeh |
| 2016/0042493 A1* | 2/2016 | MacMillan .......... H04N 5/2257 348/218.1 |
| 2016/0298218 A1 | 10/2016 | Kilmer et al. |
| 2016/0354842 A1 | 12/2016 | Schick et al. |
| 2017/0252851 A1 | 9/2017 | Fulop et al. |
| 2018/0272451 A1 | 9/2018 | Perez et al. |
| 2018/0345396 A1 | 12/2018 | Kottilingam et al. |
| 2019/0105710 A1 | 4/2019 | Klett et al. |
| 2019/0389090 A1* | 12/2019 | Roy-Mayhew ... C04B 35/63408 |
| 2021/0146607 A1 | 5/2021 | Shuck et al. |
| 2022/0126402 A1* | 4/2022 | Smathers ............... B23K 35/32 |

FOREIGN PATENT DOCUMENTS

| | | |
|---|---|---|
| DE | 102016110337 A1 | 12/2017 |
| WO | 2016/012486 A1 | 1/2016 |
| WO | 2017132322 A2 | 8/2017 |

OTHER PUBLICATIONS

Tsai et al., "High-Entropy Alloys: A Critical Review," Materials Research Letters, vol. 2, No. 3, Apr. 2, 2014, pp. 107-123.
Senkov et al., "Refractory High-Entropy Alloys," Intermetallics, vol. 18, Jun. 23, 2010, pp. 1758-1765.
Senkov et al., "Mechanical Properties of Nb25Mo25Ta25W25 and V20Nb20Mo20Ta20W20 Refractory High Entropy Alloys," Intermetallics, vol. 19, Feb. 18, 2011, pp. 698-706.
U.S. Appl. No. 17/095,201, filed Nov. 11, 2020, by Shuck et al.
Singamneni, S et al., "Curved layer fused deposition modeling", Journal for new generation sciences, vol. 8, No. 2, 2010, pp. 95-107, (Applicant points out, in accordance with MPEP 609.04(a), that the year of publication, 2010, is sufficiently earlier than the effective U.S. filing date, so that the particular month of publication is not an issue.).

* cited by examiner

FUSED FILAMENT FABRICATION OF HIGH ENTROPY ALLOYS

This application claims the benefit of U.S. Provisional Application Ser. No. 62/935,394, entitled "FUSED FILAMENT FABRICATION OF HIGH ENTROPY ALLOYS" and filed on Nov. 14, 2019, the entire content of which is incorporated herein by reference.

TECHNICAL FIELD

The disclosure relates to additive manufacturing techniques, in particular, to additive manufacturing of alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing components including high entropy alloys using fused filament fabrication.

In some examples, the disclosure describes a technique that includes depositing, via a filament delivery device, a filament onto a surface of a substrate. The filament may include a binder and a powder including at least one high entropy alloy. The technique also includes sacrificing the binder to form a preform. The technique also includes sintering the preform to form a component including the at least one high entropy alloy.

In some examples, the disclosure describes fused filament fabrication systems. The fused filament fabrication systems may include a substrate defining a surface, a filament delivery device, and a computing device. The computing device may be configured to control the filament delivery device to deposit on the surface of the substrate a filament. The filament may include a binder and a powder including at least one high entropy alloy.

In some examples, the disclosure describes a component formed by fused filament fabrication. The component may include a substrate defining a surface and at least one layer comprising a high entropy alloy formed on the surface of the substrate.

The details of one or more examples are set forth in the accompanying drawings and the description below. Other features, objects, and advantages will be apparent from the description and drawings, and from the claims.

DETAILED DESCRIPTION

Figure 1:
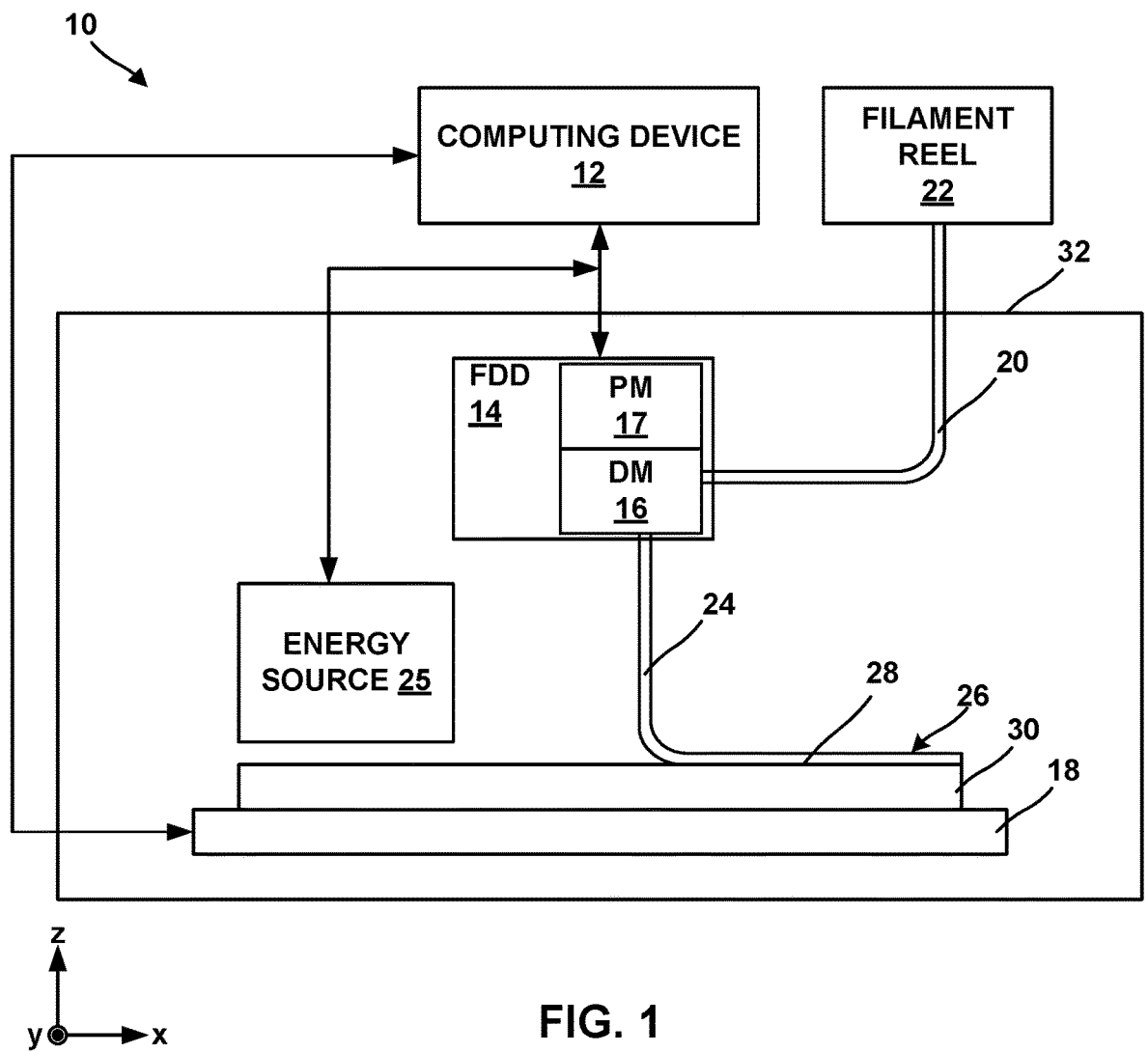
FIG. 1 is a conceptual block diagram illustrating an example system for forming an additively manufactured component by fused filament fabrication of a material including a high entropy alloy powder and a binder.

The disclosure generally describes techniques for forming additively manufactured components including high entropy alloys (HEAs) using fused filament fabrication. Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a sacrificial binder and a powder including one or more HEAs dispersed in the sacrificial binder may be deposited using fused filament fabrication to form an additively manufactured component. The one or more HEAs may include alloys having equal or relatively large proportions of a plurality of primary constituent elements, such as five or more primary constituent elements. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder including the one or more HEAs in the layers or the component. The component may be further treated, for example, by sintering, to strengthen or densify the powder including the one or more HEAs and form a sintered component. By using the material including the sacrificial binder and the powder including one or more HEAs, removing the sacrificial binder, and sintering the powder including one or more HEAs, HEAs may be used to from components, residual (free) powder may be reduced, and crack propensity may be reduced due to the absence of melting. Further, microstructure of the sintered component may be more carefully controlled, e.g., to produce components with a fine-grain, polycrystalline microstructure, by controlling microstructure of the powder and avoiding melting of the powder during processing. Although described as forming components, in some examples, the techniques described herein may be used to repair components via additive manufacturing and, optionally, machining the added material to define a desired shape.

HEA components may be useful in high temperature applications that benefit from at least one of relatively lower density, improved strength-to-weight ratio, improved creep properties, improved wear resistance, improved fatigue properties, improved rupture resistance, improved oxidation resistance, or improved tensile strength compared to other non-HEA materials. Example HEA components include, but are not limited to, aerospace components, compressors, heat exchangers, blades, vanes, nozzles, diffusers, heat shields, swirlers, cases, disks, seals, and fuel nozzles. Fused filament fabrication of HEA components may enable components to be formed from HEAs with reduced cracking propensity compared to other additive manufacturing techniques using HEAs. Other additive manufacturing techniques may include, for example, fusion-based additive manufacturing, additive manufacturing techniques using wire feedstock, welding, or the like. Without being bound to any specific theory, it is believed that fused filament fabrication of HEAs reduces the propensity of cracking of the HEA because the HEA material is not melted during the build process. Additionally, or alternatively, fused filament fabrication with HEAs may enable improved control of microstructure compared to other additive manufacturing techniques using HEAs. For example, sintering may be controlled to form microstructures that include a fine grain polycrystalline microstructure.

FIG. 1 is a conceptual block diagram illustrating an example fused filament fabrication system 10 for performing fused filament fabrication to form an additively manufactured component including a binder and an powder including one or more HEAs by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to a temperature above a softening point temperature or a melting point temperature of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material. For example, filament delivery device 14 may deposit softened filament 24 on a repair area of a component, such as an aerospace component or a gas turbine engine component, such as a compressor, a heat exchanger, a blade, a vane, a nozzle, a diffuser, a heat shield, a swirler, a case, a disk, a seal, or a fuel nozzle.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the powder including at least one HEA.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a powder including one or more HEAs and a binder configured to bind the powder in filament 20.

The powder including one or more HEAs may include any suitable combination of elements for forming an HEA additively manufactured component. In some examples, HEAs may include substantially equal or relatively large proportions of a plurality of primary constituent elements. The plurality of primary constituent elements may include, for example, five or more primary constituent elements. In some examples, each element of the plurality of primary constituent elements may constitute between about 5 atomic percent (at. %) and 35 at. % of the HEA. In some examples, HEAs may include one or more additional elements. In some examples, the one or more additional elements may constitute less than about 5 at. % of the HEA material. Example primary and additional elements in HEAs may include, but are not limited to, Al, Cr, Co, W, Ta, Nb, V, Mo, Hf, Fe, Cu, Ni, Mn, Ti, Ca, Mg, Zn, Zr, B, and Si. Example HEA materials may include, but are not limited to, $CoCrFeMn_xNi$, $Nb_{25}Mo_{25}Ta_{25}W_{25}$, $V_{20}Nb_{20}Mo_{20}Ta_{20}W_{20}$, $Al_xCoCr$-$CuFeNi$, $CaMgZnSrYb$, $AlBCoCrCuFeNi$, $AlCoCrFeNiSi$, $Co_{1.5}CrFeNi_{1.5}Ti_{0.5}Mo_x$, and $AlCu_{0.5}CoCrFeNiSi$.

In some examples, in addition to one or more HEAs, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The powder including at least one HEA may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the powder including at least one HEA dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the powder including at least one HEA and the sacrificial binder. In other examples, the heat to which the composition is exposed to form softened filaments 24 may initiate the curing reaction, and no additional energy source is used.

Filament 20 includes a selected amount of sacrificial binder and powder including at least one HEA so that the material in roads 26 may include more than about 80% by volume of the powder including at least one HEA, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

Figure 2:
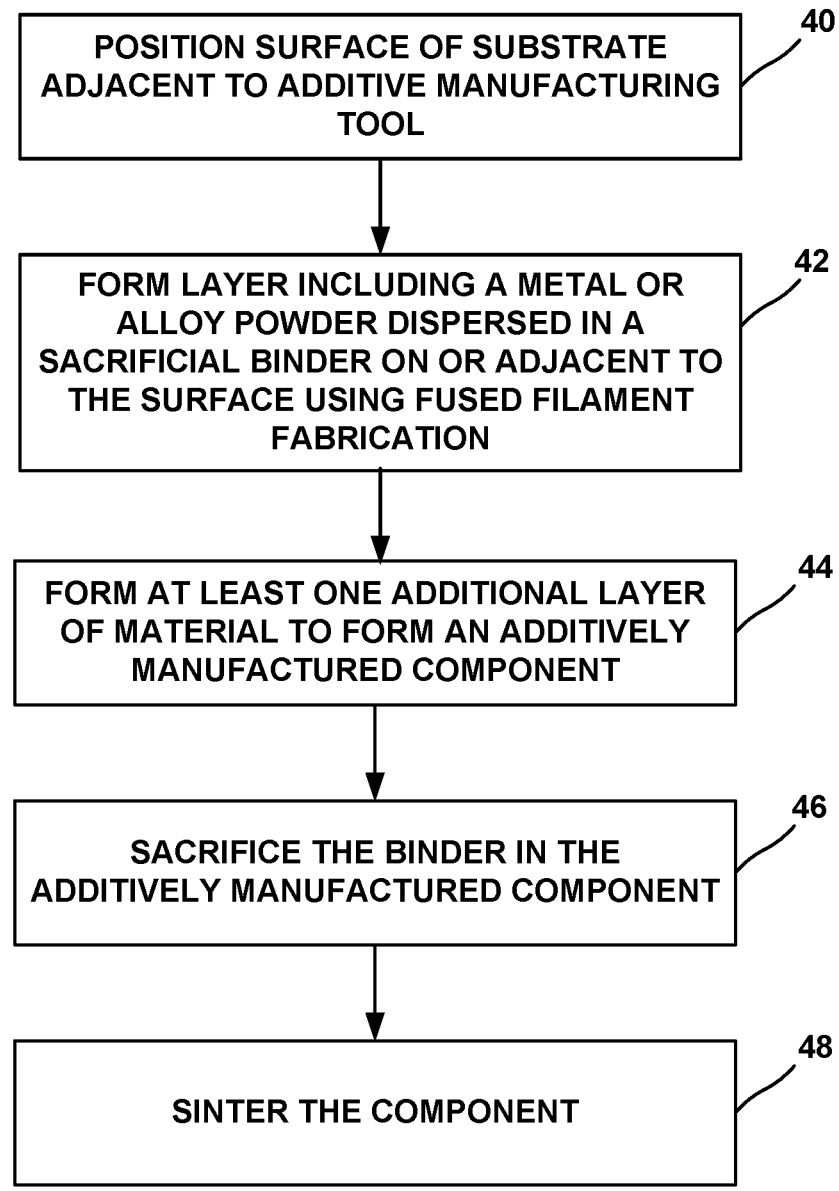
FIG. 2 is a flow diagram illustrating an example technique for forming an additively manufactured component using fused filament fabrication.

An example technique that may be implemented by system 10 will be described with concurrent reference to FIG. 2. FIG. 2 is a flow diagram illustrating an example technique for forming an additively manufactured component including at least one feature smaller than a base resolution of the additive manufacturing technique. Although the technique of FIG. 2 is described with respect to system 10 of FIG. 1, in other examples, the technique of FIG. 2 may be performed by other systems, such a system 30 including fewer or more components than those illustrated in FIG. 1. Similarly, system 10 may be used to performed other additive manufacturing techniques.

The technique of FIG. 2 includes positioning substrate 30 including surface 28 adjacent to a build position, e.g., on stage 18 (40). In some examples, system 10 may not include a separate substrate 30, the technique of FIG. 2 may include positioning a build surface defined by stage 18, or by another component, or layers of prior softened filament 24 or another material.

The technique of FIG. 2 also includes forming a road 26 of material using fused filament fabrication (42). Computing device 12 may cause filament delivery device 14 to deposit softened filament 24 in one or more roads 26 to ultimately form the additively manufactured component. A plurality of roads 26 defining a common plane may define a layer of material. Thus, successive roads 26 may define a series of layers, for example, parallel layers, and the series of layers may eventually define the additively manufactured component.

The technique of FIG. 2 also includes forming, on roads 26 of material, at least one additional layer of material to form an additively manufactured component (44). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (44).

The technique of FIG. 2 includes, after forming the additively manufacturing component (44), sacrificing the binder from the component (46). The sacrificing (46) may include delivering thermal or any suitable energy, for example, by energy source 25, to roads 24 in an amount sufficient to cause the binder to be substantially oxidized, incinerated, carbonized, charred, decomposed, or removed from roads 24, while leaving the powder including at least one HEA substantially intact. In other examples, the additively manufactured component may be placed in a furnace to heat the additively manufactured component and cause removal of the binder from the component (46).

The technique of FIG. 2 also includes, after sacrificing the binder (46), sintering the component (48). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (48) may promote the bonding of particles of the powder including one or more HEAs to each other to strengthen the component including substantially only the powder including one or more HEAs after the binder is sacrificed. Sintering may not melt the particles of powder, thus leaving the microstructure of the particles substantially intact. This may facilitate forming components with selected microstructures compared to techniques that include melting the powder. For example, sintering may enable formation of a fine grain, polycrystalline microstructure. The sintering (48) may also densify an interior or a surface region of the component, for example, by promoting powder compaction and reducing porosity. In some examples, the steps of removing the sacrificial binder (46) and sintering the component (48) may be combined in a single heating step or series of heating steps, e.g., within a furnace.

In some examples, the technique may include one or more additional processing steps including, but not limited to, hot isostatic pressing, stress relief, additional sintering, solutionizing, annealing, aging, tempering, machining, polishing, shot peening, laser shock peening, or coating. The one or more additional processing steps may provide desired mechanical properties, physical properties, thermal resistance, chemical resistance, or the like.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
depositing, via a filament delivery device, a filament onto a surface of a substrate, wherein the filament includes a binder and a powder including at least one high entropy alloy;
sacrificing the binder to form a preform; and
sintering the preform to form a component including the at least one high entropy alloy,
wherein the filament comprises at least about 80 volume percent (vol. %) of the powder including the at least one high entropy alloy,
wherein the powder including the at least one high entropy alloy comprises a plurality of primary constituent elements, each primary constituent element between 5 atom percent (at. %) and 35 at. % of the at least one high entropy alloy, and
wherein the powder including the at least one high entropy alloy comprises a composition selected from the group consisting of $Nb_{25}Mo_{25}Ta_{25}W_{25}$, $V_{20}Nb_{20}Mo_{20}Ta_{20}W_{20}$, CaMgZnSrYb, AlBCoCr-CuFeNi, AlCoCrFeNiSi, $Co_{1.5}CrFeNi_{1.5}Tio_{0.5}Mo_x$, $AlCu_{0.5}CoCrFeNiSi$, and combinations thereof.

2. The method of claim 1, wherein the powder including the at least one high entropy alloy comprises at least one additional element that constitutes less than 5 at. % of the high entropy alloy.

3. The method of claim 1, wherein the powder including the at least one high entropy alloy comprises at least five elements selected from the group consisting of Al, Cr, Co, W, Ta, Nb, V, Mo, Hf, Fe, Cu, Ni, Mn, Ti, Ca, Mg, Zn, Zr, B, and Si.

4. The method of claim 1, wherein the binder comprises a polymer selected from the group consisting of a thermoplastic, a curable polymer, polyvinyl alcohols, polyolefins, polystyrenes, acrylonitrile butadiene styrene, polylactic acids, thermoplastic polyurethanes, and aliphatic polyamides.

5. The method of claim 1, wherein the depositing the filament comprises:
positioning the substrate defining the surface adjacent to a build position;
heating the filament to a softening temperature or a melting temperature of the binder to soften the filament; and
depositing a plurality of roads of the softened filament on the surface to define a layer.

6. The method of claim 1, wherein sacrificing the binder comprises delivering energy from an energy source to the filament in an amount sufficient to cause the binder to be substantially oxidized, incinerated, carbonized, charred, decomposed, or removed from the filament to form the presintered perform.

7. The method of claim 1, further comprising:
controlling, by a computing device, the filament delivery device to deposit the filament onto the surface of the substrate.

8. The method of claim 1, further comprising:
controlling, by a computing device, an environment within an enclosure enclosing the substrate.

9. The method of claim 1, wherein the filament is a first filament, and wherein the method further comprises depositing a second filament onto the surface of the substrate, wherein the first filament has a different composition than the second filament.

10. A method comprising:
depositing, via a filament delivery device, a filament onto a surface of a substrate, wherein the filament includes a binder and a powder including at least one high entropy alloy;
sacrificing the binder to form a preform; and
sintering the preform to form a component including the at least one high entropy alloy,
wherein the filament comprises at least about 80 volume percent (vol. %) of the powder including the at least one high entropy alloy,
wherein the powder including the at least one high entropy alloy comprises a plurality of primary constituent elements, each primary constituent element between 5 atom percent (at. %) and 35 at. % of the at least one high entropy alloy, and
wherein the powder further comprises an oxide-dispersion strengthened (ODS) alloy which includes a fine dispersion of oxide particles.

11. The method of claim 10, wherein the oxide particles are oxide nanoparticles.

12. The method of claim 10, wherein the oxide particles comprise at least one of yttria, nickel chromium, thoria, nickel aluminide, iron aluminide, iron chromium aluminide, alumina, hafnia, zirconia, beryllia, magnesia, titanium dioxide, or a carbide.

* * * * *